(12) United States Patent
Dougan et al.

(10) Patent No.: US 9,348,321 B2
(45) Date of Patent: May 24, 2016

(54) METHOD, TIME CONSUMER SYSTEM, AND COMPUTER PROGRAM PRODUCT FOR MAINTAINING ACCURATE TIME ON AN IDEAL CLOCK

(71) Applicant: FINITE STATE RESEARCH LLC, Austin, TX (US)

(72) Inventors: Cort Dougan, Austin, TX (US); Victor Yodaiken, Austin, TX (US)

(73) Assignee: FINITE STATE RESEARCH LLC, Austin, TX (US)

( * ) Notice: Subject to any disclaimer, the term of this patent is extended or adjusted under 35 U.S.C. 154(b) by 302 days.

(21) Appl. No.: 13/931,149

(22) Filed: Jun. 28, 2013

(65) Prior Publication Data

US 2014/0003199 A1 Jan. 2, 2014

Related U.S. Application Data

(60) Provisional application No. 61/666,101, filed on Jun. 29, 2012.

(51) Int. Cl.
*G04R 40/00* (2013.01)
*G04G 7/00* (2006.01)
*H04J 3/06* (2006.01)

(52) U.S. Cl.
CPC ...... *G04G 7/00* (2013.01); *G04R 40/00* (2013.01); *H04J 3/0641* (2013.01)

(58) Field of Classification Search
CPC .......... G04G 7/00; G04G 7/02; G04R 40/00; H04J 3/0641
USPC .......................................................... 368/47
See application file for complete search history.

(56) References Cited

U.S. PATENT DOCUMENTS

| 4,476,445 | A | * | 10/1984 | Riley, Jr. | H03L 7/26 331/3 |
| 4,899,117 | A | * | 2/1990 | Vig | H03L 7/22 331/176 |
| 5,666,330 | A | * | 9/1997 | Zampetti | 368/47 |
| 7,251,199 | B2 | * | 7/2007 | Eidson | 368/46 |
| 7,787,576 | B2 | * | 8/2010 | Foerster | G01R 13/0254 370/498 |
| 8,120,432 | B2 | | 2/2012 | Smiley et al. | |
| 9,236,966 | B2 | * | 1/2016 | McNealy | H04J 3/0638 |

(Continued)

OTHER PUBLICATIONS

International Preliminary Report on Patentability and Written Opinion, in corresponding International Application No. PCT/US2013/048566, dated Jan. 8, 2015, 8 pages.

(Continued)

*Primary Examiner* — Sean Kayes
(74) *Attorney, Agent, or Firm* — Rothwell, Figg, Ernst & Manbeck, P.C.

(57) ABSTRACT

Methods, time consumer systems, and computer program products for maintaining accurate time on an ideal clock of a timing device are disclosed. The method includes receiving time information from a local clock, a reference clock, and one or more secondary clocks. The method further includes calculating frequencies for the local clock, the reference clock, and the one or more secondary clocks. The method further includes comparing the calculated frequencies of the reference clock to the calculated frequencies of the one or more secondary clocks. The method further includes detecting a holdover and/or a compromise situation based on the comparison. The method further includes syntonizing the ideal clock to one or more of the calculated frequencies.

19 Claims, 11 Drawing Sheets

(56) References Cited

U.S. PATENT DOCUMENTS

2002/0186619 A1* 12/2002 Reeves et al. .................. 368/47
2009/0028006 A1* 1/2009 Ha et al. ......................... 368/46
2010/0254225 A1 10/2010 Schweitzer, III et al.
2011/0261917 A1 10/2011 Bedrosian

OTHER PUBLICATIONS

International Search Report and the Written Opinion of the International Searching Authority dated Nov. 22, 2013, in International Application No. PCT/US13/48566, 16 pages.

* cited by examiner

METHOD, TIME CONSUMER SYSTEM, AND COMPUTER PROGRAM PRODUCT FOR MAINTAINING ACCURATE TIME ON AN IDEAL CLOCK

PRIORITY CLAIM AND CROSS-REFERENCE TO RELATED APPLICATIONS

The present application claims priority to U.S. Provisional Patent Application Ser. No. 61/666,101, filed Jun. 29, 2012, which is hereby incorporated by reference in its entirety.

TECHNICAL FIELD

The present invention relates generally to a method, time consumer system, and computer program product for maintaining accurate time on a timing device during periods when the reference clock is not accessible and/or is compromised. The field of use includes but is not limited to telecommunications, wireless communication, electric power distribution and transmission, and high-frequency trading.

BACKGROUND

Many electronic control systems and computing devices require an accurate time. One widely used method to accomplish this is to provide an oscillator or other timing device as a "local clock" and to synchronize the local clock to an external "reference clock". This process is analogous to checking a wrist watch (the local clock) against a presumed accurate time announced on the radio (the reference clock). Even if the wrist watch itself gains or loses time over an interval, regular updates from the radio provide enough information to accurately estimate the current time from the time shown by the wristwatch. The time on the wristwatch can be relied on between updates because it can only drift from correct time by a small amount between updates and that drift can be quantified. Technical challenges, however, arise in some fields of use as a result of very high precision requirements.

The problem of "holdover" is the problem of maintaining an accurate time even when updates from the reference clock are interrupted for a relatively extended interval. The problem of compromise detection involves detecting frequency changes in the reference clock. Providing a method for holdover and protecting against compromise is important in telecommunications, industrial control, power transmission and distribution, military equipment, and also in a growing number of commercial computing applications. For example, financial trading systems depend on the distribution of accurate time to compute trading latency and find patterns in trading results. These trading systems are thus vulnerable to interruptions in or compromise of GPS signals.

SUMMARY

Particular embodiments of the present invention include methods, systems, and computer program products for providing holdover capability and compromise detection by deriving high quality "secondary reference frequency" information from a secondary clock (or collection of clocks) despite inaccuracies in clock signal and/or high signal delay variation. In particular, the methods, systems, and computer program products of the present invention permit the use of a time signal delivered via a network, a network within an enterprise or even the Internet, as a source of precise frequency information. Particular embodiments of the disclosed solution derive the secondary reference frequency and apply this derived frequency information to holdover and compromise detection. The methods, systems, and computer program products of the present invention enable ubiquitous availability and low cost of access to such time sources. The secondary clock is used to measure both the current frequency of the local clock and the reference clock. If the reference clock frequency changes, the possibility of compromise can be detected. If the reference clock becomes unavailable, the frequency measure derived from the second clock can be used to compensate for frequency changes in the local clock.

According to some embodiments, a method for maintaining accurate time on an ideal clock of a timing device is disclosed. The method includes receiving time information from a local clock, a reference clock, and one or more secondary clocks. The method further includes calculating frequencies for the local clock, the reference clock, and the one or more secondary clocks. The method further includes comparing the calculated frequencies of the reference clock to the calculated frequencies of the one or more secondary clocks. The method further includes detecting a holdover and/or a compromise situation based on the comparison. The method further includes syntonizing the ideal clock to one or more of the calculated frequencies.

According to some embodiments, a time consumer system for maintaining accurate time on an ideal clock is disclosed. The time consumer system includes a processor and a computer readable memory coupled to the processor. The computer readable memory contains computer readable program instructions that configure the processor to receive time information from a local clock, a reference clock, and one or more secondary clocks. The time consumer is further configured to calculate frequencies for the local clock, the reference clock, and the one or more secondary clocks. The time consumer is further configured to compare the calculated frequencies of the reference clock to the calculated frequencies of the one or more secondary clocks. The time consumer is further configured to detect a holdover and/or a compromise situation based on the comparison. The time consumer is further configured to syntonize the ideal clock to one or more of the calculated frequencies.

According to some embodiments, a computer program product includes a non-transitory computer readable medium having stored thereon executable computer instructions for maintaining accurate time in an ideal clock of a timing device. The computer instructions are configured to cause a computer to receive time information from a local clock, a reference clock, and one or more secondary clocks. The computer instructions are configured to cause a computer to calculate frequencies for the local clock, the reference clock, and the one or more secondary clocks. The computer instructions are configured to cause a computer to compare the calculated frequencies of the reference clock to the calculated frequencies of the one or more secondary clocks. The computer instructions are configured to cause a computer to detect a holdover and/or a compromise situation based on the comparison. The computer instructions are configured to cause a computer to syntonize the ideal clock to one or more of the calculated frequencies.

In one embodiment, a time consumer can use the secondary clock to measure a time interval, detect the number of "ticks" counted by the local clock during that time interval and compute local clock frequency. If the local clock counts N ticks during the interval and the secondary clock measures elapsed time T, the average duration of a clock tick is T/N and the average frequency is N/T.

When the reference clock is operational, the same measurement can be performed and the frequencies of the reference clock and the secondary clock can be compared. If these change with respect to each other, the frequency of one must have changed and thus a possible compromise event has been detected.

If the ideal clock begins in a synchronized state and if the derived secondary reference frequency is sufficiently accurate, holdover can be implemented by using the secondary reference frequency to correct for drift in the local clock or local clocks.

In one embodiment, a computing device connected to a GPS time source as the reference clock may also be able to receive time over the Internet from the National Institute for Standards and Technology (NIST) clocks using NTP. The NIST internet clock, in general, is not suitable for the purpose of synchronizing the ideal clock because packet delay variations can be several milliseconds long on current Internet technology. However, over intervals of time significantly longer than the delay variation, the elapsed time will be accurate. This permits the ideal clock computation to update its frequency estimates for the local clock and accurately compensate for variations in local clock frequency.

In another embodiment, the time consumer may repeatedly query the secondary clock, discarding any responses that take too long or otherwise do not meet filter criteria to improve the quality of the duration measurement.

In yet another embodiment, the time consumer may collect a series of measurements and then compute a "best fit" frequency or best fit function for the local clock. Those skilled in the art will appreciate that variations on how to fit the frequency estimate to the data can be made without departing from the disclosed methods and devices of the present invention.

In another embodiment, the time consumer may track multiple overlapping intervals from the secondary clock and use these to find patterns in the frequency changes of the local clock to improve frequency compensations. For example, some local clocks show a periodic behavior, speeding up and slowing down possibly in response to fans turning on and off. Once such patterns have been characterized, the time consumer may use them to predict frequency changes.

In one embodiment, the time consumer is a server computer, the reference time is a bus card with a GPS clock module, the local clock is an oscillator connected to a processor "time stamp register" which operates as a counter, and the secondary clock is an internet connection to the National Institute of Standards and Technology (NIST) time via a network device connected to a local network and then out to the Internet via switches and routers.

In another embodiment, the time consumer is a server computer, the reference clock is a PTP grandmaster connected via IRIG to a GPS receiver, the local clock is an oscillator connected to a processor "time stamp register" which operates as a counter, and the secondary clock is the same NIST connection as in the previous embodiment. The secondary clock can be employed for holdover and compromise detection for any type of primary reference clock.

In yet another embodiment, the time consumer is a base station for a cellular telephone system, the reference clock is a GPS receiver, the local clock is a TCXO oscillator and the secondary clock is a receiver for a time signal encoded in a radio signal from a neighboring base station. As long as a precise frequency can be derived from the secondary clock, the method can be employed.

In another embodiment, a server computer may use multiple secondary clock sources connected to multiple remote clocks over a network. The elapsed time may be computed as a weighted average of the measured elapsed times or via a voting mechanism or some other means of increasing the reliability of the frequency measure from the secondary sources.

In another embodiment, the secondary clock frequency may come from the same physical device as the primary external reference clock. For example, a number of commercial "network time clock" devices that act as PTP master clocks synchronized to a GPS source in one mode, can switch to modes where the quality of the synchronization is degraded or the protocol changes. One such device will switch to a holdover mode using an internal temperature controlled oscillator or rubidium timer when GPS reception is interrupted or of poor quality. However, due to several factors, the quality of that holdover time may not be as high as the quality of the holdover time that can be produced using the method of the present invention by discarding the synchronization information from the PTP source while using its frequency information as in the example above. Similarly, some devices have a failure mode in which they cannot produce PTP but fall back on a less accurate NTP implementation. The present invention permits the client system to use the NTP source for frequency information during a holdover.

In another embodiment, the time consumer may produce a reliable frequency calculation from a number of unreliable clocks. For example, a time consumer connected to a number of other time consumers may request that each forward its local clock times and then average together this time to produce a secondary clock from which a reliable frequency can be derived. Those skilled in the art will appreciate that more sophisticated aggregation methods than simple averaging can be used without departing from disclosed methods and devices of the present invention.

The above and other aspects and embodiments are described below with reference to the accompanying drawings.

BRIEF DESCRIPTION OF THE DRAWINGS

The accompanying drawings, which are incorporated herein and form part of the specification, illustrate various embodiments of the present disclosure and, together with the description, further serve to explain the principles of the disclosure and to enable a person skilled in the pertinent art to make and use the embodiments disclosed herein. In the drawings, like reference numbers indicate identical or functionally similar elements.

DETAILED DESCRIPTION

Figure 1:
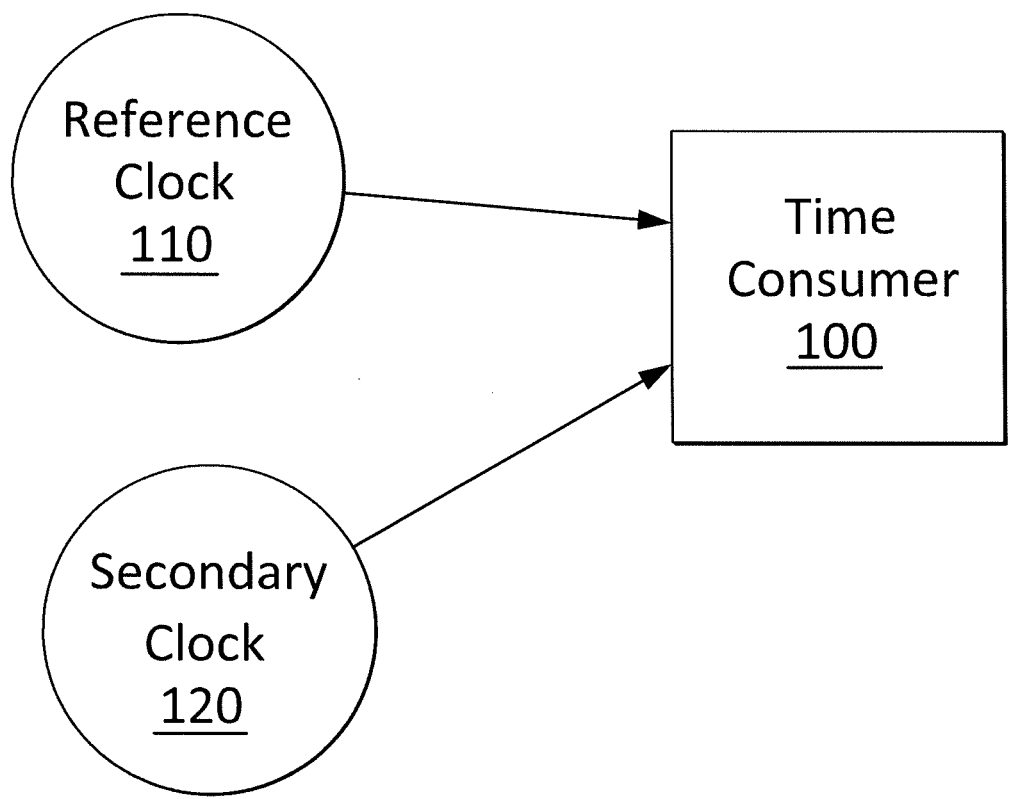
FIG. 1 is a block diagram showing a time consumer connected to both a reference clock and a secondary clock, in accordance with exemplary embodiments of the present invention.

The methods and devices of the present invention can derive frequency data from a possibly inaccurate source of time and use that data to detect frequency changes in a reference clock and to maintain correct time during failures of the reference clock.

For example, if a radio, which serves as a reference clock, is only intermittently operational, a highly accurate chronometer might be purchased and synchronized with radio updates so that when the radio is unavailable, e.g., during a holdover, a wrist watch may be periodically synchronized to the chronometer. If the accuracy of the chronometer is higher than the wrist watch, the wrist watch time can be maintained close to the reference time until the radio is available again. Additionally, suppose that the clock in the radio station temporarily slows, e.g., a compromise, and the wrong time is announced. A secondary time source may be used to detect such compromise.

In what follows, a "clock" is a device or combination of devices and software that produces a time signal (that may, for example, be an electrical signal or a value in a register or in a network packet). A "time consumer" is a computing or communications or control device that reads or receives or detects time signals from clocks. A "time consumer" may contain one or more "local clocks" and may communicate with one or more external clocks. A time consumer generates an "ideal clock" that is in some way derived from the signals or values obtained from external clocks in combination with the signals or values obtained from local clocks and perhaps other information. A reference clock is a clock that has been chosen as the authoritative time source. The problem of "synchronization" in this context is the problem of keeping the ideal clock adjusted so that it produces a time as close as possible to the time produced by the reference clock. The problem of "holdover" concerns maintaining synchronization during an interruption or degradation of the signal from the reference clock. The problem of "compromise" involves detecting changes in the frequency of the reference clock.

According to one example, the time consumer is a computer server, the reference clock is a device following signals received from the Global Positioning System (GPS) satellites, and the local clock is a computer crystal oscillator driving a counter. However, the crystal oscillators provided on commercial computer boards are known to change frequency during operation, particularly, but not only, as device temperature changes. Additionally, the GPS signal is not always available, and the GPS receiver is not completely reliable. One solution to holdover in such a configuration is to provide an additional more stable secondary oscillator that is temperature controlled (TCXO) or "ovenized" (OCXO), such as an atomic clock of some sort (like a Rubidium clock), and to fall back on this secondary reference when the primary reference clock is not available. Producing a time that involves a combination of a reference clock and a local oscillator is a well-known process.

The problem of compromise of the reference time source involves temporary inaccuracies in the external time source. That is, if the external time source changes frequency for some reason, it would be useful to detect this and then go into holdover mode until the drift ceases or some external source (such as an operator) validates the signal. In particular, the GPS signal has been shown to be susceptible to "spoofing" in which someone deliberately modifies the time signal. The provision of a rubidium clock or temperature controlled or "ovenized" oscillator is one method for cross checking the authoritative time source.

Using the time of a GPS signal as a reference clock is just one example. The external reference time may also be obtained from alternative satellite systems (such as COMPASS and GALILEO), from an atomic clock, over an IRIG signal, a Pulse Per Second (PPS) signal, or via a computer network using IEEE 1588 Precision Time Protocol (PTP), the Network Time Protocol (NTP) or some other messaging protocol. Additionally, synchronous Ethernet can be used to directly distribute a time frequency that might be used to verify the external time reference or to correct the external time reference. Similarly, the crystal oscillator might be a counter, or a MEMS device, or something else that provides a local time interval.

Computation of time by the time consumer, given a local clock and an external reference clock, usually involves a process of constructing a synthetic clock with an "ideal time." This is done by both synchronizing (setting the ideal time to match the external reference time) and syntonizing (setting the frequency of the ideal clock to match the frequency of the external time reference). Syntonization involves determining the frequency of the local clock so that intervals computed by that source can be adjusted to match the interval that would have been measured by the external reference. In the illustrative example, the time broadcast on the radio might be written down and the offset from the wristwatch computed. At the next update on the radio, the drift of the wristwatch over the interval could be computed and this would give information on the difference between the frequency of the reference time source and the frequency of the wristwatch. The wristwatch time could be "corrected," at times between radio updates, by using the frequency adjustment. In a more realistic example, the frequency differential between the crystal oscillator and the GPS clock would be computed and used to compute the ideal time.

Signal Delay Variation (SDV) is the time variation of the time it takes for clock data (the signal) to travel from the clock to the time consumer and become available to the time consumer for calculation. When the time is communicated over a packet network, SDV is called Packet Delay Variation (PDV). Because of SDV, the signal from the clock carries a time that is inaccurate by some variable quantity when it arrives at the time consumer. Generally, SDV is very low for the local clock, and to be usable for synchronization purposes, the reference clock SDV must also be small. If the SDV of the reference clock increases too much, a holdover condition can be triggered.

There are several disadvantages to providing a second reference clock in the form of a rubidium clock or temperature controlled oscillator. The most significant is the additional expense of temperature controlled oscillators and the even more expensive rubidium clocks. A second disadvantage is that these devices are long-term stable but some may be subject to considerable inaccuracies over shorter intervals. These devices are also not immune to device failure, and if the rubidium clock ceases to work, it cannot be used to provide holdover. Finally, there may be mechanical, power supply or other issues involved in providing these devices. Note that in order to minimize SDV, the rubidium clock/TXCO or similar device is generally placed physically close to the time consumer—making it more expensive and more difficult to share among multiple time consumers. Accordingly, exemplary embodiments of the invention provide alternative means for providing holdover capabilities and authoritative source compromise detection.

FIG. 1 is a block diagram showing a time consumer 100 connected to both a reference clock 110 and a secondary clock 120. In exemplary embodiments, time consumer 100 may be connected to a reference clock 110 and secondary clock 120. In some embodiments, the connections between time consumer 100 and reference clock 110 and secondary clock 120 may be hardwired so that the connection is within the same computing device. In other embodiments, a hardwire connection may be used across different computing device. In some embodiments, one or both of the connections may be across one or more communications networks via a cable or wireless connection.

Figure 2:
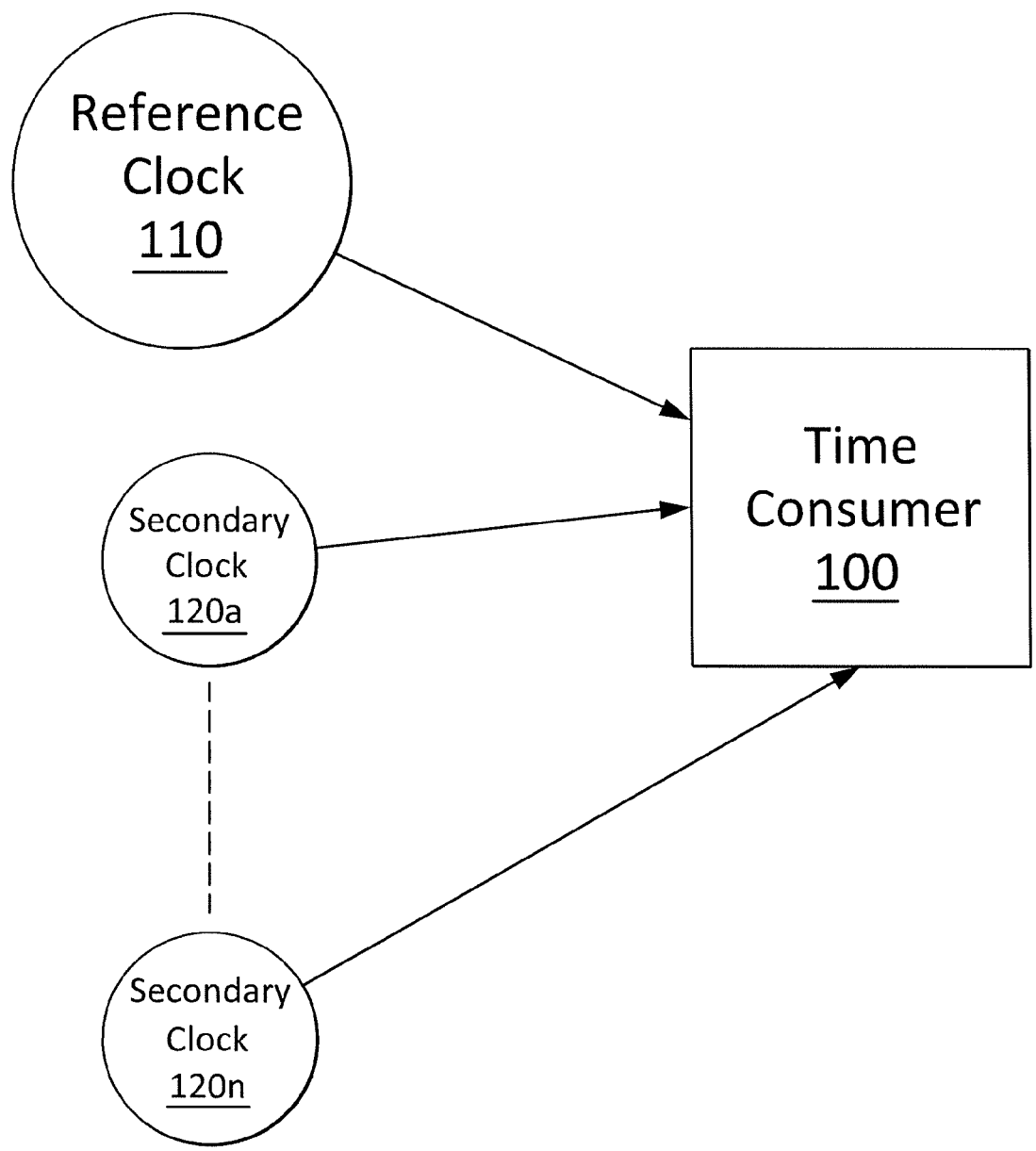
FIG. 2 is a block diagram showing a time consumer connected to a reference clock and a plurality of secondary clocks, in accordance with exemplary embodiments of the present invention.

FIG. 2 is a block diagram showing a time consumer 100 connected to a reference clock 110 and a plurality of secondary clocks 120a-120n. In some embodiments, the "secondary clock" may be an aggregated collection of clocks. The connections between the secondary clocks 120a-120n and the time consumer 100 may consist of a hardwired connection in the same computing device, or a wired or wireless connection across one or more computing devices, or any combination of hardwired, wired, and wireless connections.

Figure 3:
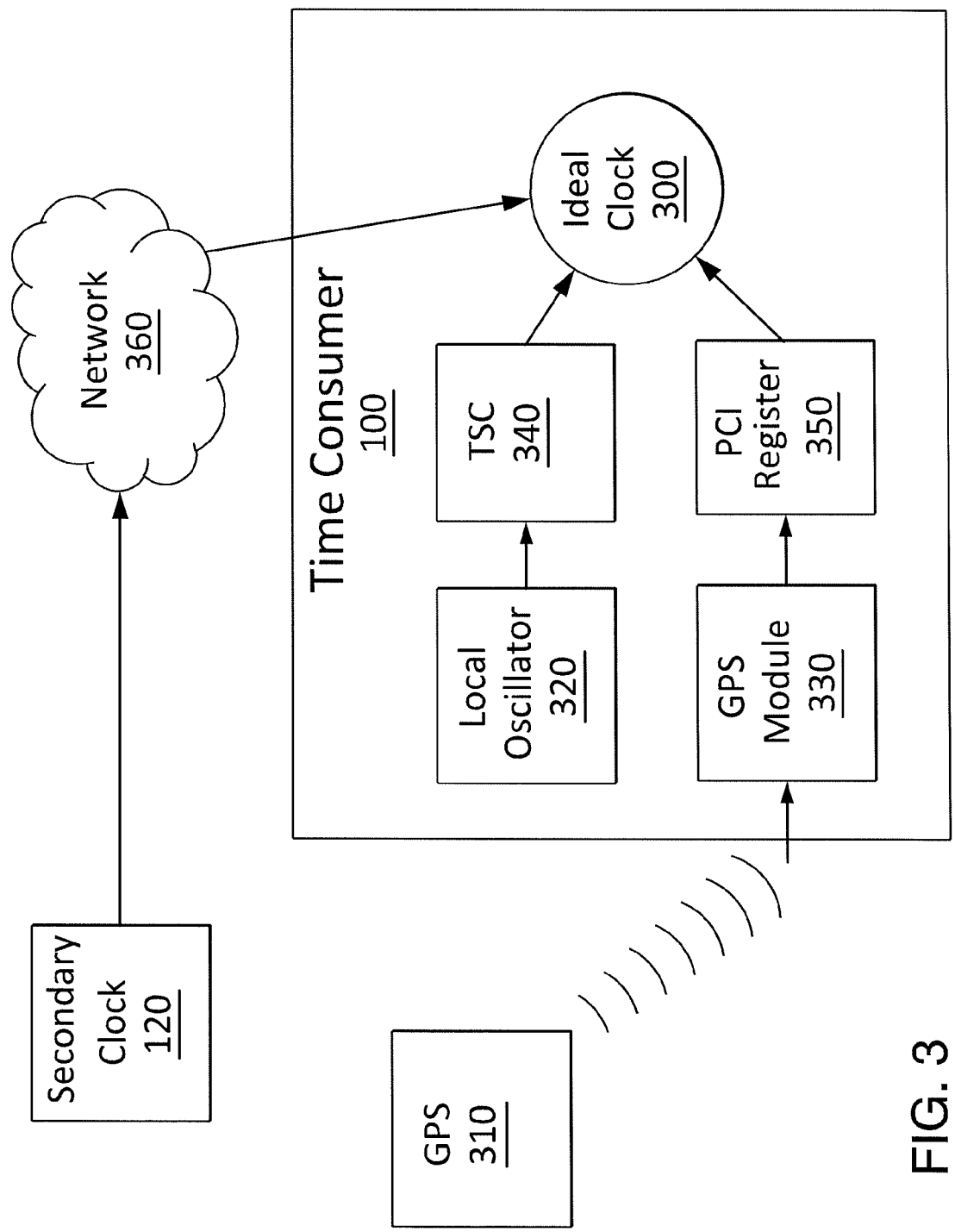
FIG. 3 is a block diagram illustrating the calculation of an ideal clock from the local clock, reference clock, and secondary clock, in accordance with exemplary embodiments of the present invention.

FIG. 3 is a block diagram illustrating the calculation of an ideal clock 300 from the local clock 320/340, reference clock 310, and secondary clock 120. FIG. 3 shows one embodiment in which a time consumer 100 includes a GPS module 330 that drives a PCI register 350 and a local oscillator 320 that drives a time stamp counter (TSC) 340. In some embodiments, the GPS module 330 may be a component of a bus card illustrated in FIG. 5, as discussed below, that is configured to receive GPS time information from a GPS device 310. In the illustrated embodiment, GPS device 310, as coupled with the GPS module 330 and PCI Register 350, serves as a reference clock. Additionally, the local oscillator 320, coupled with the TSC 340, serves as a local clock.

In some embodiments, secondary clock time information is transmitted by a secondary clock 120 to a communications network 360. The ideal clock 300, located in time consumer 100, may receive the secondary time information from secondary clock 120 via communications network 360. In some embodiments, the secondary clock data may be, for example, time information from one or more NIST clocks.

In some embodiments, local clock time information, generated from the local oscillator 320 and TSC 400, may be transmitted to ideal clock 300. In some embodiments, reference clock time information from GPS device 310 is transmitted to ideal clock 300. Frequency data extracted from the secondary clock 120 is used both to crosscheck the GPS 310 time information (for compromise detection) and to maintain the correct time if the GPS clock in GPS 100 fails (holdover).

In a financial trading system, for example, holdover may only be needed until the trading day completes and a new module can be installed (or reception problems can be cleared up). A processor may be connected to a crystal oscillator 320 that drives a running counter called a Time Stamp Counter (TSC) 340. The TSC 340 is the local time source. In this embodiment, a network device connects the time consumer 100, which is a computing device, to a computer network 360 connected to the Internet, and the time consumer 100 periodically requests the time from NIST or another secondary clock 120 using NTP. In normal operation, the data for the ideal clock 300 is obtained by periodically polling the reference clock, or GPS 310, for reference time, using that information to compute the actual frequency of the local clock and then, between updates, using the TSC interval since the last time read from the reference time, plus current frequency estimate for the local time source. If the system detects that the reference clock is no longer working, the average TSC count over an interval previously computed, for example over a 5 minute interval, is computed against the time reported by the Internet connection to the secondary clock 120, or NIST clock. In practice, these computations may also involve more sophisticated calculations, including the use of smoothing and filtering methods.

In another embodiment, a time consumer 100 contains a network card with an oscillator 320 that is connected over a high speed local network 360 to a device that acts as a IEEE 1588 PTP "master clock." The processor is connected to a crystal oscillator 320 that drives a running counter called a Time Stamp Counter (TSC) 340. The TSC 340 is the local time source. In this embodiment, the same or a second network device connects the time consumer 100 to a computer network 360 connected to the Internet and the device periodically requests the time from a secondary clock 120 using NTP. In normal operation, the ideal clock 300 is obtained by some combination of time provided in PTP packets, delay information from the network card oscillator 320 (used to reduce PDV imprecision on PTP packets), historical data with some smoothing/filtering algorithms, and a computation of the actual frequency of the local clock. Then, between PTP updates, the ideal clock 300 is obtained by using the TSC interval, the last time read from the reference time, plus current frequency estimate for the local time source. If the system detects that the PTP reference clock 310 is no longer working, the same method used in the previous embodiment is employed to compute the actual frequency of the local time source.

The methodology is applicable to any type of time consumer 100 device that can be configured to communicate to a secondary clock 120 via a network, including, for example, a mobile device such as a wireless telephone, a personal digital assistant, an electronic reader (e.g. an Amazon Kindle), or a personal tablet computer (e.g., an Apple iPad); a server computer; a laptop computer; and a personal computer.

Figure 4:
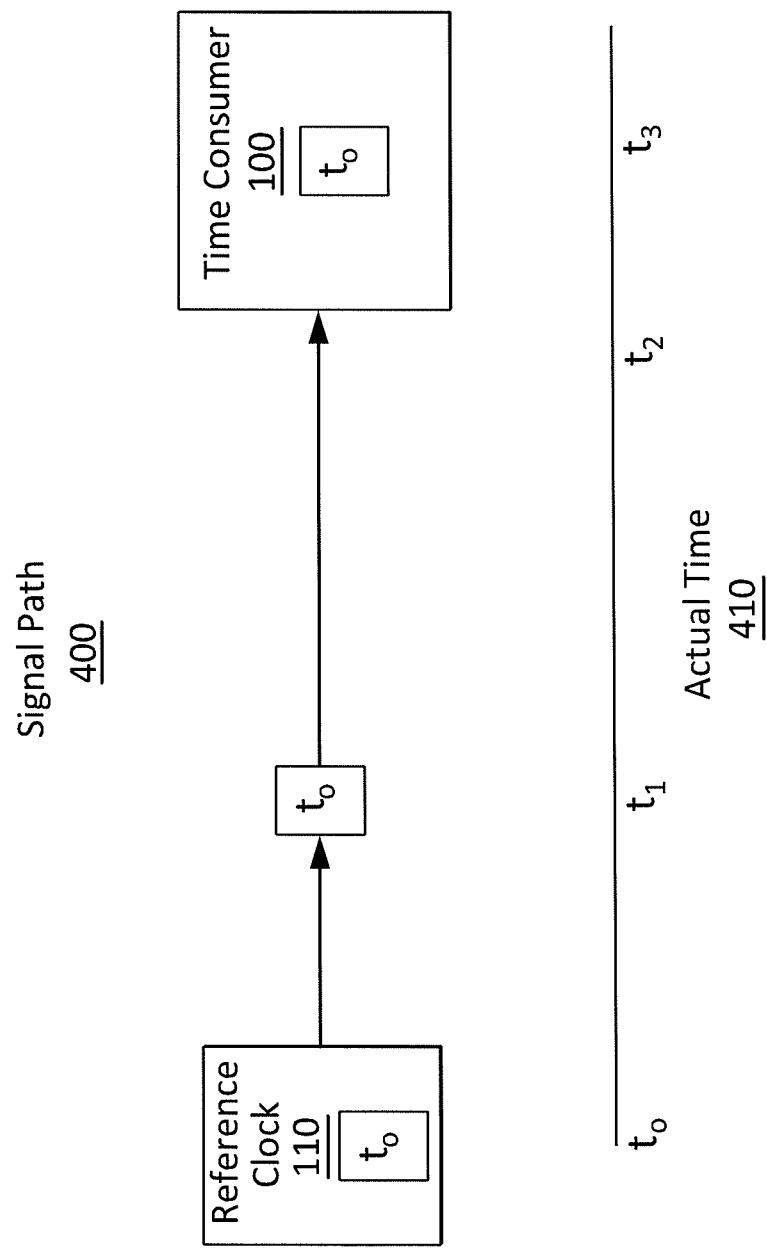
FIG. 4 is a timeline illustrating the concept of signal delay variation, in accordance with exemplary embodiments of the present invention.

Referring now to FIG. 4, a timeline illustrating the concept of signal delay variation is shown. A signal 400 carrying time information is produced by the reference clock 110 at time $t_0$ and only arrives at the time consumer 100 at time $t_3$, as illustrated by the actual time timeline 410. As a result of signal delay, the point at which the time information, produced at time $t_0$, is received at the time consumer 100 at $t_0$, the time information is no longer accurate. Furthermore, if the delay between $t_0$ and $t_3$ varies, it is difficult for the time consumer to accurately compensate for delay.

Figure 5:
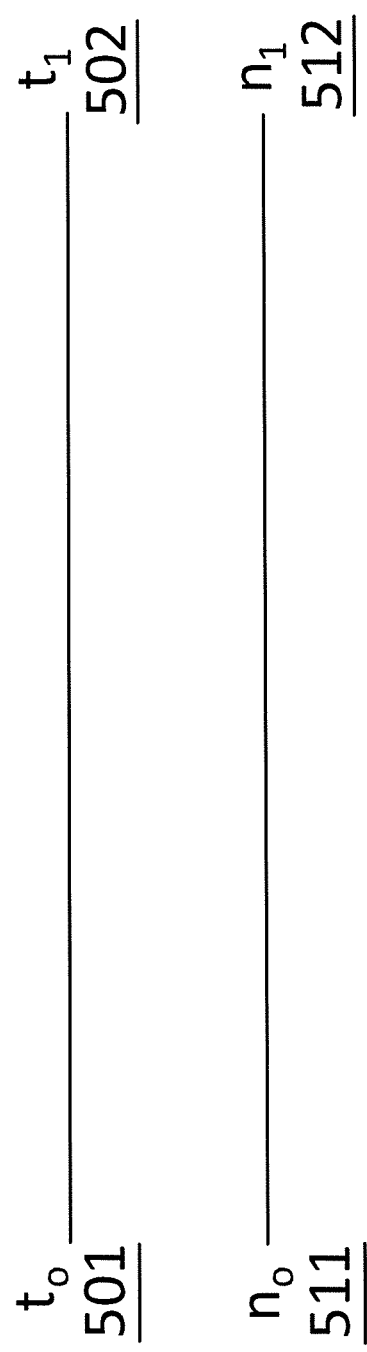
FIG. 5 is a timeline illustrating the simultaneous recording of secondary time and local frequency information, in accordance with exemplary embodiments of the present invention.

Referring now to FIG. 5, a timeline illustrating the simultaneous recording of secondary time and local frequency information is shown. The TSC count $n_0$ 511 could be recorded at time consumer 100 just as a time update from a secondary clock, such as a NIST clock, $t_0$ 501 is received. In accordance with exemplary embodiments, the TSC count $n_1$ 512 may be recorded at the time consumer 100 just as a secondary clock update $t_1$ 502 is received, indicating the passage of some computed time interval. This information may be used to update the computed frequency of the local clock with the simplest calculation being that the frequency is $(n_1-n_0)/(t_1-t_0)$.

Embodiments of the methods and devices of the present invention rely on an extraction of precise frequency data from an imprecise time source. The secondary clock 120 is an imprecise time source because of the variable delay in response to requests for time from the client or time consumer 100. For example, suppose the time consumer 100 requests a time and receives a response 10 milliseconds later. The time value in the response packet, in theory, could have been produced by the remote clock, or secondary clock 120, at almost any time within that 10 millisecond interval. For example, if the request took 1 millisecond to reach the remote clock and the remote clock took 1 millisecond to generate a response, and 8 milliseconds passed before the response was received by the client, the time value in the packet is 8 milliseconds less than the actual time. On the other hand, if the request took 5 milliseconds to reach the clock, the clock took 4 milliseconds to produce the response, and the response took 1 millisecond to reach the client, the time value in the packet is only 1 millisecond less than the actual time.

Although this variation, often described as Packet Delay Variation (PDV), can be reduced via a variety of filtering and smoothing techniques and via hardware assist, such as time stamps from switching and routing and network devices along the route, there are limits to such techniques. However, exemplary embodiments of the present invention rely on the previously unexploited high accuracy of frequency information that can be extracted from such a secondary clock 120 source. If, for example, we measure a 2 minute interval with such a source and there is a 10 millisecond delay on both ends, the worst case error in the interval is 20 milliseconds, which is 0.000167% a value that can be reduced with longer errors and/or smoothing/filtering.

In one embodiment, the time consumer 100 will use historical data to determine the minimal response time delay that can be expected, and then begin an interval only after some request has produced a response with such a delay. The same method can be used by a time consumer 100 to determine when to end the interval—since the important quality is how exactly the interval is measured, not whether the interval is of some preset duration. So, an interval of 122 seconds plus or minus 5 milliseconds is more precise than one of exactly 120 seconds plus or minus 20 milliseconds. The time consumer 100 can also track multiple intervals and overlapping intervals to better measure actual frequency changes in the local time source. In cases where network quality permits, the time scale can be reduced: given a high quality connection to a secondary time source, the intervals might be milliseconds, or even of shorter duration. However, the intervals should be long enough to permit accurate frequency time calculation.

For purposes of illustration, suppose that the a received NTP time is associated with a delay ranging between ½ and 10 milliseconds. When a time t is read from a NTP packet, the time consumer 100 only has information that the real time is between t+½ millisecond and t+10 milliseconds. This level of delay variation is much too high for synchronization. However, because the secondary clock 120, such as a NIST clock, is very precise, an interval beginning when time t is read from a packet and ending when time t+2 minutes is read from a packet is within 20 milliseconds of 2 minutes. That raw error is very small compared to the interval and, if the external clock is reliable, it can be used to reliably measure the frequency of the local clock over that interval. The raw error can be made more precise with filtering and/or smoothing. The exact duration of the appropriate interval, the appropriate smoothing and filtering methods, and other details will depend on the quality of the connection to the clock and the required accuracy and sensitivity of the ideal clock.

Figure 6:
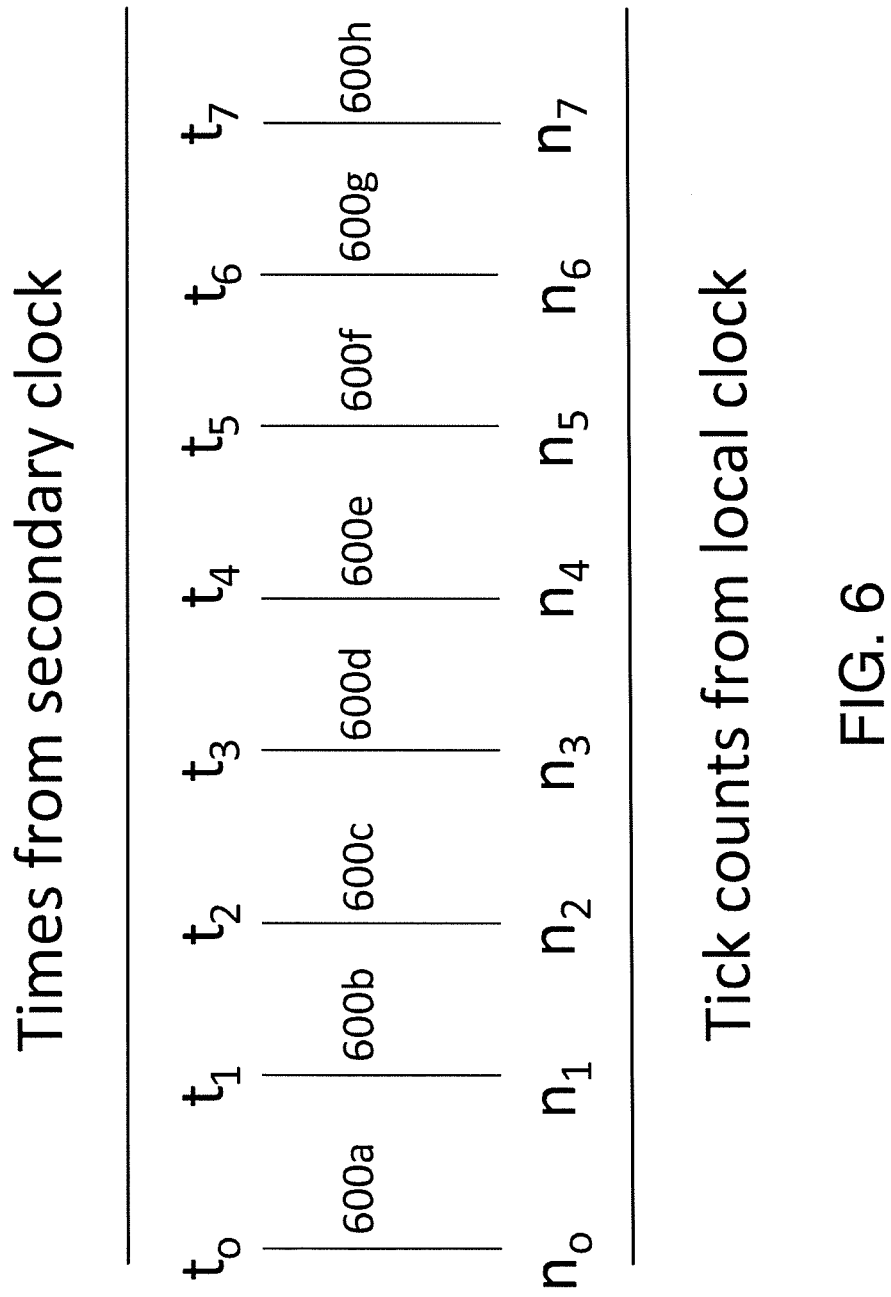
FIG. 6 is a timeline illustrating multiple secondary time and local frequency measurements, in accordance with exemplary embodiments of the present invention.

Referring now to FIG. 6, a timeline illustrating multiple secondary time and local frequency measurements is displayed. Instead of the simple elapsed time calculation described above, a method for using interpolation or other signal processing methods to produce a function for estimating local clock frequency via data fitting can be used. In one embodiment, the time consumer 100 can record a sequence of matching pairs 600a-h of TSC counts and clock signals from the secondary clock 120, and then use some interpolation or curve fitting algorithm to determine an equation for the frequency of the local clock. A least squares algorithm, for example, has excellent results in certain environments. Variations in interpolation method and/or the application of some filtering to the raw data can be used in different circumstances. There are many well-known methods from signal processing that those skilled in the art will appreciate could be used for this purpose.

Figure 7:
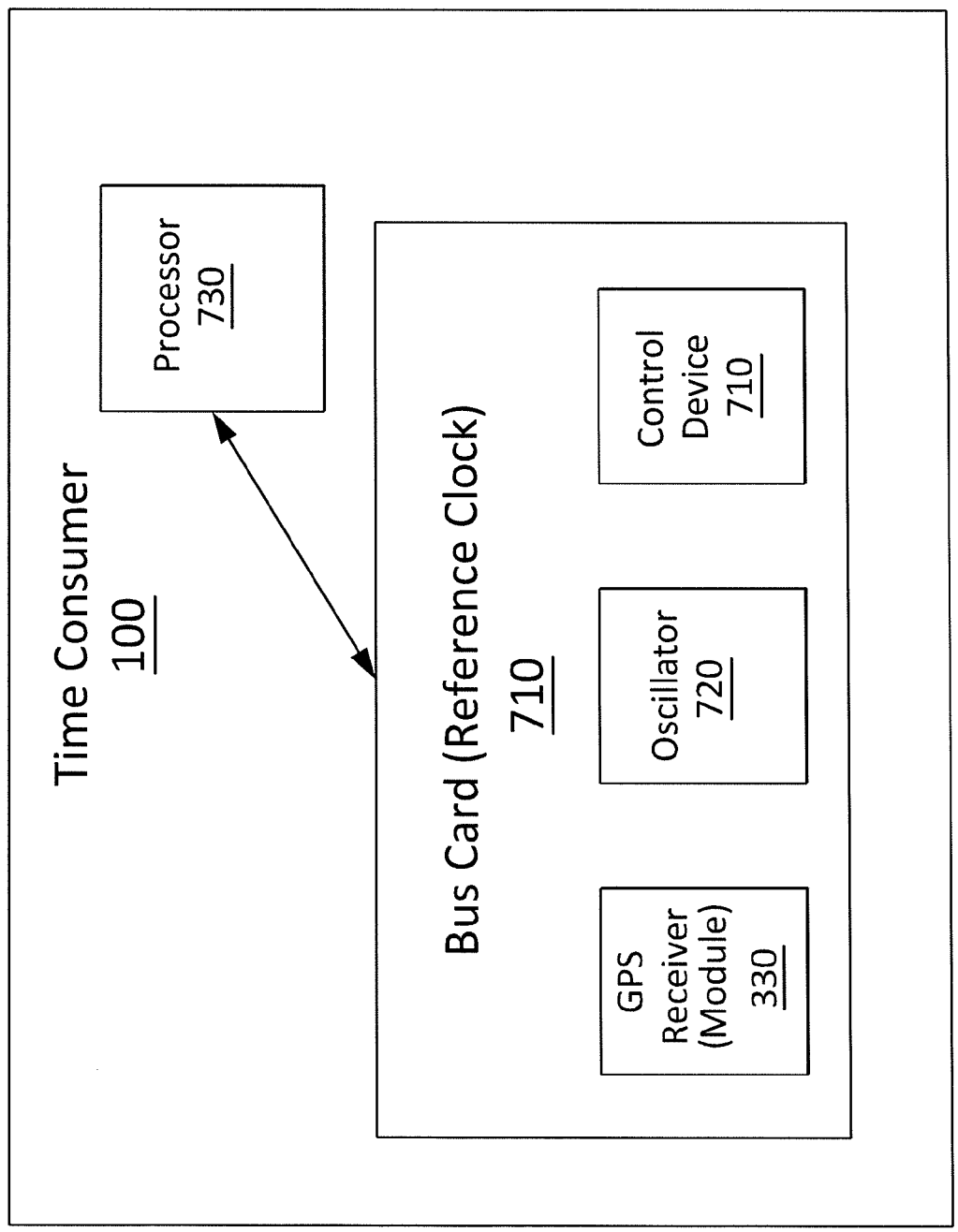
FIG. 7 is a bus card that contains a GPS receiver which produces a running time value, in accordance with exemplary embodiments of the present invention.

Referring now to FIG. 7, a bus card that contains a GPS receiver which produces a running time value is displayed. The reference clock 110 may be a bus card 710 that includes a GPS receiver and module 330, and electronic components including one or more oscillators 720 and control devices 700 that produce a running time value in a register that can be read by the main processor 730 of the time consumer 100. In the current state of practice, the reference time from the bus card can be accurate down to a few tens of nanoseconds.

Figure 8:
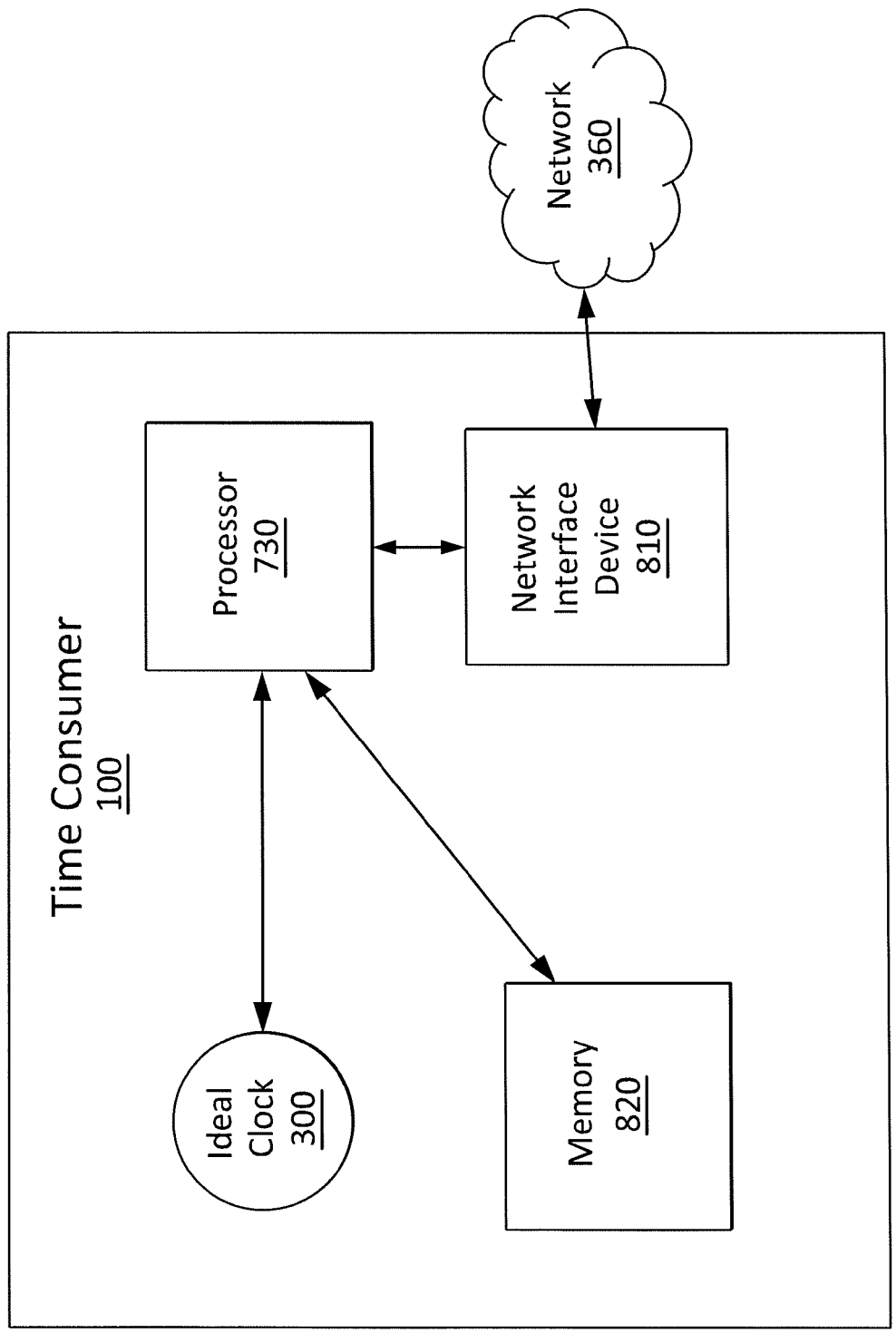
FIG. 8 is a block diagram of a time consumer, in accordance with exemplary embodiments of the present invention.

Referring now to FIG. 8, a block diagram of a time consumer is shown. In some embodiments, time consumer 100 may be a communication device that includes a processor 730, a network interface device 810, a memory 820, and an ideal clock 300. Computer readable program code may be stored in a non-transitory computer readable medium/memory 820, such as, but not limited to, magnetic media (e.g., a hard disk), optical media (e.g., a DVD), memory devices (e.g., random access memory), and the like. In some embodiments, time consumer 100 may be connected to an external or internal database to store, for example, the time and clock frequency information disclose above.

In some embodiments, computer readable program code is configured such that when executed by a processor 730, the code causes the processor 730 to perform steps described above and shown in the figures. In other embodiments, the processor 730 of time consumer 100 is configured to perform the steps described above and below without the need for code. That is, for example, the processor 730 may consist of one or more ASICs. Hence, the features of the present invention described herein may be implemented in hardware and/or software. For example, in particular embodiments, the ideal clock 300 may be implemented as hardware or software, or by any suitable combination of hardware and/or software.

Figure 9:
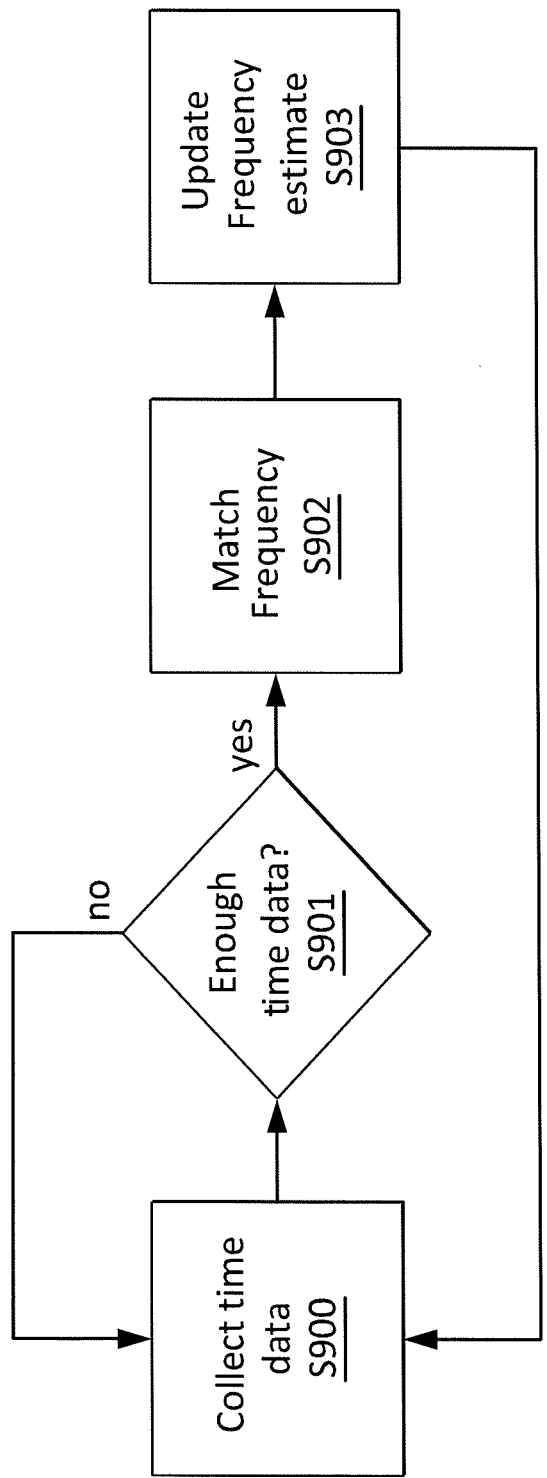
FIG. 9 is a flow chart illustrating the steps performed by the time consumer to calculate local frequency drift, in accordance with exemplary embodiments of the present invention.
Figure 10:
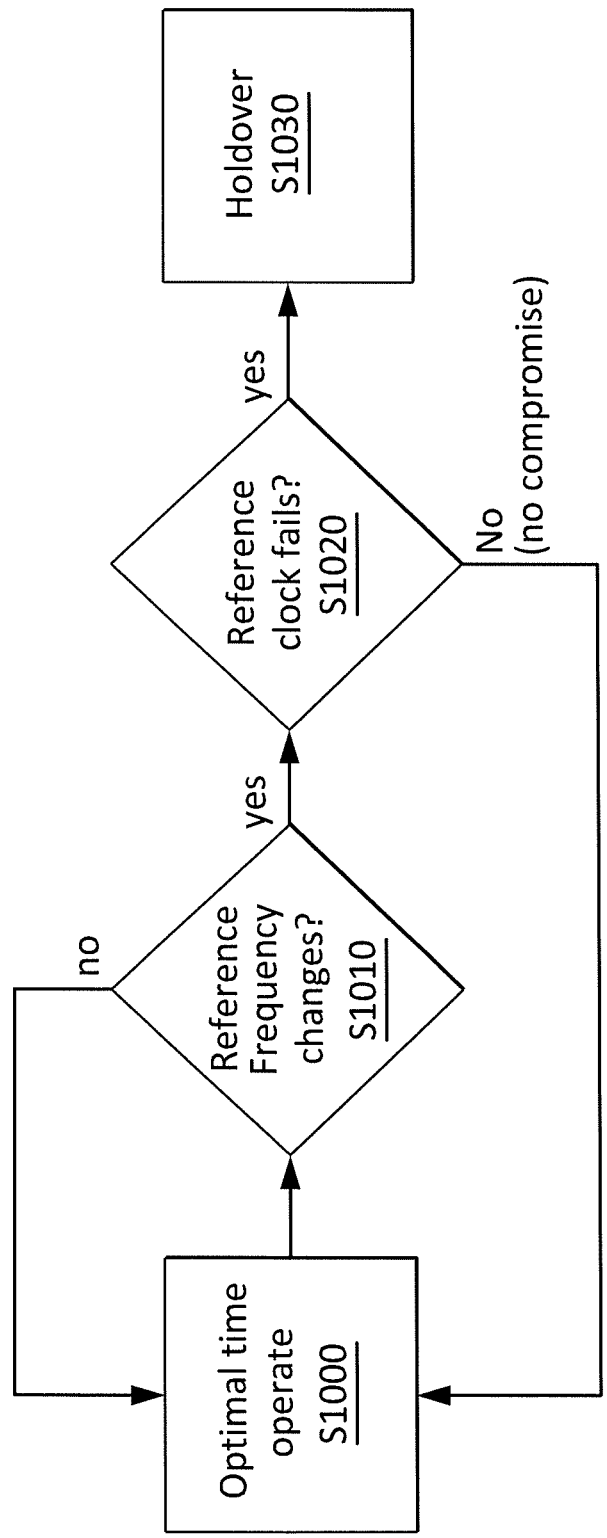
FIG. 10 is a flow chart illustrating the steps performed by the time consumer to perform either holdover or detect a compromise, in accordance with exemplary embodiments of the present invention.

Now referring to FIG. 9, a flow chart illustrating the steps performed by the time consumer to calculate local frequency drift are displayed. In some embodiments, the time consumer 100 collects time data from reference clock 110 in step S900. In step S901, if enough time data is collected from reference clock 110, then the frequency of the ideal clock 300 is matched to the frequency of reference clock 110 in step S902. If there is not enough time data, then the time consumer 100 continues to collect time data from reference clock 110 in Step S900. Once the frequency is matched in step S902, an updated frequency estimate is calculated in step S903. As explained above, the estimate may be calculated using a variety of methods, such as smoothing and filtering methods Now referring to FIG. 10, a flow chart illustrating the steps performed by the time consumer to perform either holdover or detect a compromise are displayed. In some embodiments, ideal clock 300 of time consumer 100 will continue to operate in step S1000 based on a certain reference clock 110 frequency. In step S1010, if the reference frequency has not changed, then the ideal clock 300 will continue to operate in step S1000 based on the currently used reference clock 110 frequency. However, if the reference frequency has changed, then in step S1020 it is determined if the reference clock 110 has failed. For example, as described above, the frequencies of the reference clock and the secondary clock can be compared. If the frequencies change with respect to each other, then the frequency of one has changed and thus a possible compromise or holdover has been detected. If the reference clock 110 has not failed, then there is no compromise and the ideal clock 300 is matched to the changed reference frequency 300, and the ideal clock 300 continues to operate in step S1000. However, if the reference clock 110 has failed, then a holdover procedure is performed in step S1030. In accordance with exemplary embodiments, the holdover procedure is implemented by using the secondary clock 120 reference frequency to correct for drift in the local/ideal clock or clocks 300.

Figure 11:
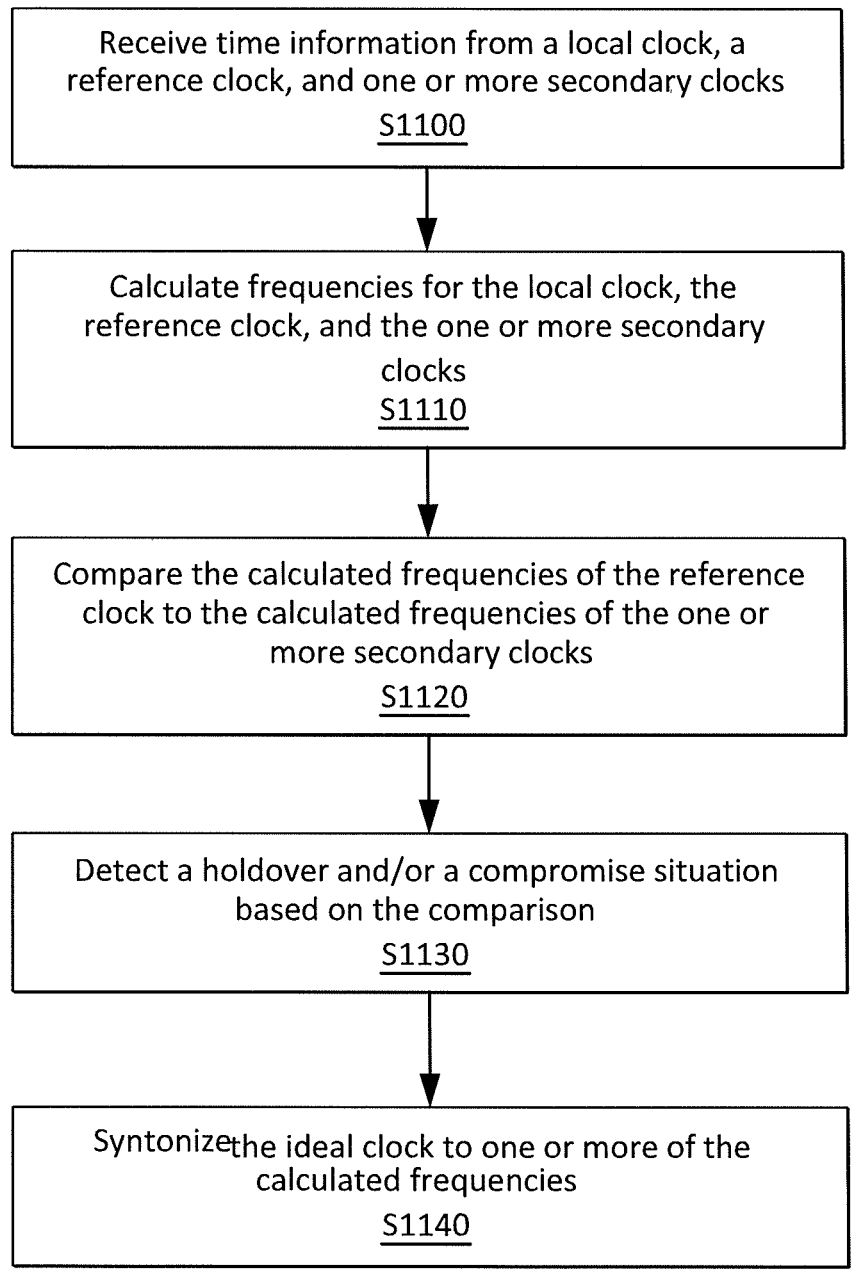
FIG. 11 is a flow chart illustrating a method for maintaining accurate time on an ideal clock of a timing device.

Now referring to FIG. 11, a flow chart illustrating a method for maintaining accurate time on an ideal clock of a timing device is displayed. In some embodiments, time information from a local clock, a reference clock, and one or more secondary clocks may be received in step S1100. In step S1110, in some embodiments, the received time information may be used to calculate the frequencies of the local clock, the reference clock, and the one or more secondary clocks. In step S1120, in some embodiments, the calculated frequencies of the reference clock may be compared to the calculated frequencies of the one or more secondary clocks. In step S1130, in some embodiments, a holdover and/or a compromise situation may be detected based on the comparison In step S1140, in some embodiments, the ideal clock may be syntonized to one or more of the calculated frequencies.

While various embodiments have been described above, it should be understood that they have been presented by way of example only, and not limitation. Thus, the breadth and scope of the present disclosure should not limited by any of the above-described exemplary embodiments. Moreover, any combination of the above-described elements in all possible variations thereof is encompassed by the disclosure unless otherwise indicated herein or otherwise clearly contradicted by context.

While the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method for maintaining accurate time on an ideal clock of a timing device, comprising:
   receiving time information from a local clock, a reference clock, and one or more secondary clocks;
   calculating frequencies for the local clock, the reference clock, and the one or more secondary clocks;
   comparing the calculated frequency of the reference clock to the calculated frequencies of the one or more secondary clocks;
   determining whether the calculated frequency of the reference clock has changed with respect to the calculated frequencies of the one or more secondary clocks;
   detecting a compromise situation in response to determining that the calculated frequency of the reference clock has changed with respect to the calculated frequencies of the one or more secondary clocks; and
   in response to detecting the compromise situation, syntonizing the ideal clock to one or more of the calculated frequencies of the one or more secondary clocks.

2. The method of claim 1, further comprising:
   syntonizing the ideal clock to the calculated frequency of the reference clock if no compromise situation is detected.

3. The method of claim 1, wherein the one or more secondary clocks comprise one or more National Institute for Standards and Technology Internet clocks.

4. The method of claim 1, wherein the calculated frequencies of the reference clock, the one or more secondary clocks, and the local clock comprise best fit frequencies based on the received time information from the reference clock, the one or more secondary clocks, and the local clock, respectively.

5. The method of claim 1, further comprising:
   storing the calculated frequencies.

6. The method of claim 1, further comprising:
   initiating a holdover mode in response to detecting a compromise situation.

7. The method of claim 6, further comprising:
   detecting that the compromise situation has ended; and
   in response to detecting that the compromise situation has ended:
      terminating the holdover mode, and
      syntonizing the ideal clock to the calculated frequency of the reference clock.

8. The method of claim 1, wherein the time information from the one or more secondary clocks is received over a packet network.

9. The method of claim 8, wherein the received time information from the one or more secondary clocks is subject to a packet delay variation.

10. The method of claim 9, wherein the receiving of the time information from the one or more secondary clocks is periodic, further comprising:
    using historical data of the packet delay variation to determine a minimum expected response time delay, and
    wherein the calculating frequencies comprises using an interval of time, the interval of time beginning at a first time where the time information from the one or more secondary clocks is received with the minimum expected response time delay and ending at a second time where the time information from the one or more secondary clocks is received with the minimum expected response time delay.

11. A time consumer system for maintaining accurate time on an ideal clock comprising:
    a processor, and
    a computer readable memory coupled to the processor, wherein the computer readable memory contains computer readable program instructions that configure the processor to:
    receive time information from a local clock, a reference clock, and one or more secondary clocks;
    calculate frequencies for the local clock, the reference clock, and the one or more secondary clocks;
    compare the calculated frequency of the reference clock to the calculated frequencies of the one or more secondary clocks;

determine whether the calculated frequency of the reference clock has changed with respect to the calculated frequencies of the one or more secondary clocks;

detect a compromise situation in response to determining that the calculated frequency of the reference clock has changed with respect to the calculated frequencies of the one or more secondary clocks; and, in response to detecting the compromise situation, syntonize the ideal clock to one or more of the calculated frequencies of the one or more secondary clocks.

12. The time consumer system of claim 11, wherein the processor is further configured to:

syntonize the ideal clock to the calculated frequency of the reference clock if no compromise situation is detected.

13. The time consumer system of claim 11, wherein the time consumer comprises one of:

a server computer and a base station for a communications system.

14. The time consumer system of claim 11, wherein the processor is further configured to calculate best fit frequencies for the reference clock, the one or more secondary clocks, and the local clock based on the received time information from the reference clock, the one or more secondary clocks, and the local clock, respectively.

15. The time consumer system of claim 11, further comprising a database, wherein the calculated frequencies are stored in the database.

16. A computer program product comprising a non-transitory computer readable medium having stored thereon executable computer instructions for maintaining accurate time in an ideal clock of a timing device, the computer instructions are configured to cause a computer to perform operations comprising the following steps:

receiving time information from a local clock, a reference clock, and one or more secondary clocks;

calculating frequencies for the local clock, the reference clock, and the one or more secondary clocks;

comparing the calculated frequency of the reference clock to the calculated frequencies of the one or more secondary clocks;

determining whether the calculated frequency of the reference clock has changed with respect to the calculated frequencies of the one or more secondary clocks;

detecting a compromise situation in response to determining that the calculated frequency of the reference clock has changed with respect to the calculated frequencies of the one or more secondary clocks; and, in response to detecting the compromise situation, syntonizing the ideal clock to one or more of the calculated frequencies of the one or more secondary clocks.

17. The computer program product of claim 16, wherein the computer instructions are further configured to cause the computer to perform operations comprising the following step:

syntonizing the ideal clock to the calculated frequency of the reference clock if no compromise situation is detected.

18. The computer program product of claim 16, wherein the computer instructions are further configured to cause the computer to perform operations comprising the following step:

calculating best fit frequencies for the reference clock, the one or more secondary clocks, and the local clock based on the received time information from the reference clock, the one or more secondary clocks, and the local clock, respectively.

19. The computer program product of claim 16, wherein the computer instructions are further configured to cause the computer to perform operations comprising the following step:

storing the calculated frequencies.

* * * * *